June 17, 1941.          R. H. KRUEGER          2,245,689
ROOF STRUCTURE
Filed Dec. 19, 1940
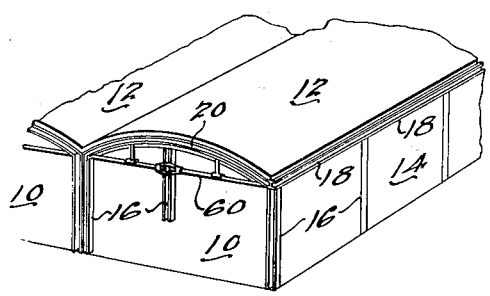
FIG. 1.
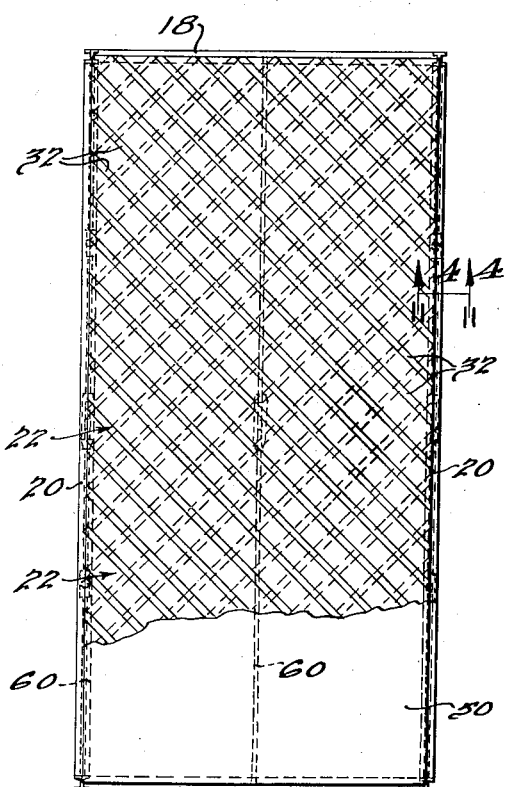
FIG. 2.
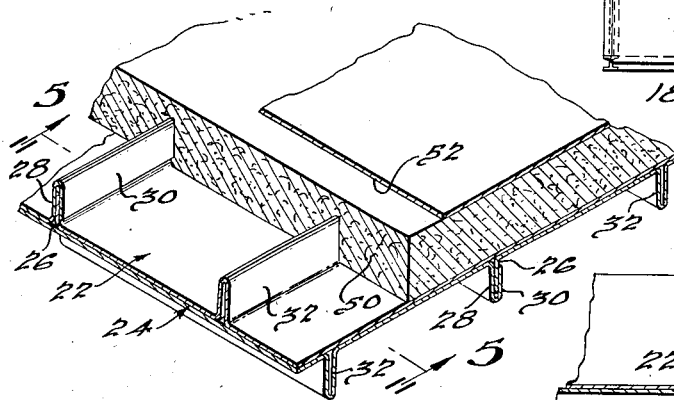
FIG. 3.
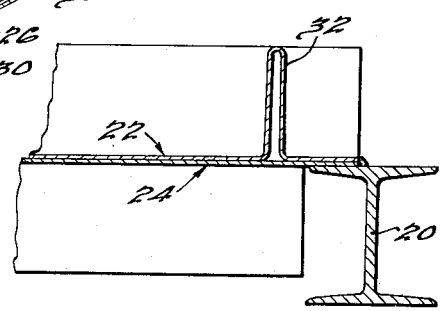
FIG. 4.
FIG. 5.
INVENTOR
Richard H. Krueger.
BY
Harness, Dickey & Pierce.
ATTORNEYS.

Patented June 17, 1941

2,245,689

UNITED STATES PATENT OFFICE 2,245,689

ROOF STRUCTURE

Richard H. Krueger, Detroit, Mich., assignor to H. E. Beyster Corporation, Detroit, Mich., a corporation of Michigan Application December 19, 1940, Serial No. 370,745

7 Claims. (Cl. 108—1)

This invention relates to roof structures and is particularly adaptable to that type of roof structure required to extend over and cover a relatively long span, the principal object being the provision of a structure of this type that is simple in construction, light in weight and economical to build.

Other objects of the invention include the provision of a roof structure capable of use over a relatively long span but which will be materially lighter in weight than conventional roof structures of an equivalent span and yet will be amply strong for the purpose required; the provision of a roof structure of the type described in which the principal elements consist of sheet metal members formed to present ribs projecting outwardly from the surface thereof on one side only thereof and arranged in back-to-back relationship with the surfaces opposite the ribs in contact with one another and with the ribs on one side extending in a direction transverse to the ribs on the opposite side thereof; the provision of a structure of the type described consisting of two superimposed layers of sheet metal members, such members being substantially planular but being formed to provide upstanding ribs on one side thereof, the ribs on the upper of said members projecting upwardly and the ribs on the lower of said members projecting downwardly, and the members being arranged in flat contacting relation with each other and rigidly fixed together with the ribs on the upper of said members extending in a direction transverse to the direction of the ribs on the lower of said members; the provision of a roof structure as above described in which the ribs on the various members extend diagonally with respect to the length and breadth of a roof section formed thereby; the provision of a roof structure of the type described in which the roof is of the arched or convexly curved type subjecting the members substantially entirely to compression; the provision of a roof of the type described in which the space between the ribs on the upper of said members is filled with a heat insulation material; the provision of a roof structure of the type described in which the space between the ribs on the upper of said members is filled with a relatively solid mass of material serving to reinforce the upper of said members against distortion under load; and the provision of a roof structure of the type described in which the space between the ribs on the upper of said members is filled with a mixture of Portland cement and vermiculite whereby to both serve as a heat insulating material and as a reinforcement for the ribs of the upper members against distortion under load.

The above being among the objects of the present invention, the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a fragmentary perspective view of a building provided with a roof constructed in accordance with the present invention:

Fig. 2 is an enlarged plan view of one of the sections of the roof shown on the building in Fig. 1 with a portion of the covering and filling material removed to better illustrate the construction;

Fig. 3 is an enlarged fragmentary, partially broken, partially sectioned perspective view of a portion of the roof structure shown in Figs. 1 and 2;

Fig. 4 is a still further enlarged fragmentary sectional view taken on the line 4—4 of Fig. 2 and illustrating a preferred method of securing the sheet metal roof members to a roof beam where the latter is employed; and, Fig. 5 is a reduced, fragmentary, sectional view of the upper member assembly taken as on the line 5—5 of Fig. 3.

Roof structures required to span a relatively great distance without support have, in accordance with conventional practice, involved a considerable amount of structural steel necessarily involving a great weight and running into considerable cost in their construction. In addition, in conventional constructions when the space below the roof requires heating, it requires the application of insulating material to the roof which has no material value from the standpoint of increasing the strength thereof but serves primarily, from a structural standpoint, as an additional dead load which must be carried by the roof structure. It is the main purpose of the present invention to provide a roof structure in which the use of structural steel members is minimized to a great extent and may even be eliminated entirely, the structural steel members of conventional construction being replaced by sheet metal members of such conformation and so arranged as to provide a roof with ample factor of safety and yet weighing only a fraction of the corresponding roofs constructed in accordance with conventional practice. Additionally, with the structure of the present invention heat insulating material may readily be applied to a roof in a simple and economical manner and where such insulation material is of a desired type it actually serves to further stiffen the structure and increase the factor of safety thereof.

Although the present invention may be employed for roofs of either the flat or convexly curved or arched type, it is particularly adapted to the latter type of roof inasmuch as in such cases all of these elements are constantly under a compressive stress, thus enabling the same depth and weight of structure to be employed for curved or arched roofs having greater spans than in the case of flat roofs. This latter type of construction is illustrated in the drawing by way of illustration and not by way of limitations as will be readily appreciated, although the application of the invention to the convexly curved or arched type of roof does include certain structural advantages as compared to flat roofs and which, accordingly, constitutes the more limited phase of the present invention.

Referring to Fig. 1, a fragment of a building is there illustrated as comprising a plurality of adjacent sections or bays indicated generally at 10, each section or bay having its own convexly curved or arched roof indicated generally at 12. It will, of course, be understood that the equivalent of one bay 10 under one roof section 12 may, when provided with side and end walls, constitute an individual building all by itself, the multiple type being shown merely by way of illustration. In the particular building structure shown the type of structure includes a side wall indicated generally at 14, an open front which may or may not be closed by suitable walls, doors, or the like, and being open on the side opposite the side 14 into the next section or bay.

It may be assumed for the purpose of description that the sections or bays 10 are of relatively great width, for instance in the neighborhood of 100 feet, and that no supporting columns are permitted between the side walls and the main portion of the same. Accordingly, along each side of each section or bay columns 15 are provided. These columns along each side are connected at the top by structural steel members such as channels 18 rigidly secured thereto. Although not necessary in the broader aspects of the present invention, it will sometimes be desirable that corresponding columns 16 on opposite sides of each section 10 be connected by structural members such as I-beams 20 curved in conformance with the curvature of the roof. Accordingly, between each pair of adjacent structural members 20 a roof section, as shown in Fig. 2, constructed in accordance with the present invention is provided.

The main load carrying portion of the roof is constructed from a plurality of upper members indicated generally at 22 and a plurality of lower members indicated generally at 24, both formed from sheet metal and while they are not necessarily identical to each other they may be, particularly for the purpose of economy in manufacture, and are thus shown in the drawing by way of illustration. Each member 22 and/or 24 is formed from a flat sheet of metal of suitable length. One marginal edge portion thereof is bent or flanged outwardly in approximately perpendicular relationship to the plane of the sheet as indicated at 26 and the opposite marginal side edge of the sheet is first bent outwardly away from the plane of the sheet as at 28 and then bent back towards the plane of the sheet as at 30 to provide a more or less hook-like portion along such side edge, the two portions 28 and 30 being separated from one another by a distance substantially equal to the thickness of the material from which the sheet is made. In other words, the spacing is such that a flange 26 on a cooperating member may be received in the hooked edge 28—30 and to facilitate such insertion the two portions 28 and 30 may diverge from one another slightly from their connected edges.

Where the overall thickness or depth of the members 22 or 24 is relatively great and the gauge of the metal relatively great, the flange 26 along one side of the sheet and the portion 28—30 along the opposite side may be the only changes required in the flat sheet. Where the overall thickness of the members is not so great and the gauge of the metal employed is moderate, the sheet at one or more points intermediate the opposite side edges thereof may be formed or bent to provide a rib-like projection 32 thereon preferably of the same depth as the portion 28—30 and with the sides thereof arranged at a corresponding angle to the plane of the sheet. Where ribs such as 32 are provided they are preferably equally spaced from each other and from the flange 26 and portion 28—30 over the width of the sheet and, of course, the ribs 32 are parallel with the sides of the sheet. In the particular structure shown by way of illustration one rib 32 is provided centrally of each sheet as indicated best in Fig. 5.

In constructing the roof a plurality of sections 22 are assembled in side-to-side relation with the flange 26 of each section 22 received within the hook-shaped rib 28—30 of the next adjacent section as indicated in Figs. 3 and 5 whereupon the flange 26 and cooperating portions 28 and 30 are suitably fixed together as by welding or the like. The sections 24 are likewise assembled in the same manner. The sections 22 are arranged with their flanges 26, portions 28—30 and ribs 32 projecting upwardly and the sections 24 arranged with their flanges 26, portion 28—30 and ribs 32 projecting downwardly, and the members 22 and 24 are arranged in flat contacting relationship with respect to each other and rigidly fixed together as by welding or the like. In assembling the members 22 and 24 together, the ribs 32 on the upper members 22 are preferably arranged perpendicularly to the length of the ribs of the lower members 24 as indicated so that the ribs, flanges and the like of the upper and lower sections stiffen the roof in directions perpendicular to each other.

In the broader aspects of the invention the strips 22 may extend longitudinally of the section illustrated in Fig. 2, that is parallel to the structural members 20, with the sections 24 extending crosswise of such section or vice versa, but in the preferred embodiment the members 22 and 24 are arranged diagonally with respect to the length of the section illustrated in Fig. 2 as illustrated in the drawing. The ribs 32 in such case and, of course, the equivalent ribs formed by the portions 28, 30 and 26 which, in the broader aspects of the invention, are also to be understood as constituting ribs equivalent to the ribs 32, extending in diagonal relation with respect to the length and width of the corresponding section, and the ribs of the members 22 extending crosswise of the ribs of the member 24, provides an extremely rigid structure either for a flat roof or for a curved roof. However, when employed for a curved or arched roof both members 22 and 24 will be under constant compression and, accordingly, may be employed for longer roof spans than the same size and weight of structure employed for a flat roof.

It will be understood that the members 22 and 24 will not in most cases be constructed from a single sheet of metal of sufficient length to bridge the greatest distance between the members 20 in the structure shown but will ordinarily be made up in lengths of, for instance, 25 feet long arranged in end-to-end and preferably abutting relationship with respect to each other and suitably secured together either directly or through the intermediary of the over or underlying members. In constructing a roof with these members it is, of course, preferable that the length of each section 22 be so arranged that the joints between adjacent sections thereof are overlapped with respect to the joints in the next adjacent sections so as to eliminate any possible line of weakness which might otherwise occur.

The members 22 and 24 are initially formed straight or flat and where this roof construction is used on a curved or arched roof as illustrated, the members 22 and 24 may either be passed through suitable rolls to bring them to approximately the curvature desired in the roof, or they may simply be allowed to sag or be pressed into their curved conformation whichever method of procedure is desired.

In constructing a roof of the type described the members 16, 18 and 20 are, of course, first put up and then the various roof sections are fabricated between each set of opposed members 18 and opposed members 20. The members 24 are first applied, beginning at one corner between adjacent members 18 and 20, and the ribs or their equivalent 32 cut away at the ends of the members so as to permit the edges of the flat portion of the members 24 to extend over the upper faces of the members 18 and 20 to at least approximately the center thereof as illustrated in Fig. 4 and such projected edges are then welded to the members 18 or 20. The members 24 are, of course, applied one after the other and preferably with the flanged edge 26 on that side of the members to which the next adjacent member is to be added so as to facilitate the application of one member 24 to another until the entire space between the members 18 and 20 is enclosed by the members 24. Where the roof is of the curved or arched type it may, of course, be necessary to suitably support or stress the members 24 during their application to bring them to the required curvature unless they have been brought to the desired curvature prior to their application to the roof structure. After the members 24 are applied, then the members 22 are applied over the members 24 with the ribs 32, of course, extending preferably at the same angle with respect to the length of the corresponding roof section but in an angularly opposite direction. The members 22 and 24 are preferably arranged at an angle of 45° to the length of the roof section so that when the members 22 are applied to the members 24 the ribs of the members 22 extend in a direction perpendicular to the direction of the ribs 32 on the members 24, as shown. The members 22 are, of course, suitably secured to the members 24 as by welding, riveting or the like. When the members 22 are applied it is, of course, not necessary to cut away the ends of the ribs 32 inasmuch as they may be projected over to approximately or beyond the center of the beams 18 or 20 without interference with other members and this has the effect of adding rigidity to the connection between the members 22 and 24 and the beams 18 or 20.

Bulging of the central portions of the ends of the roof section under load is resisted to a high degree in the construction shown because of the diagonal and crossed relationship of the members 22 and 24 without further support than the members 18. However, where additional precautions are desired to be taken to prevent such bulging, tension rods such as 60 may be extended between corresponding columns 16 on opposite ends of the roof section and between the opposite members 18 at any desired location, such as in the center as shown in Fig. 2.

After the roof has been constructed as thus far described it may, if desired, be covered in the state described with a suitable weather repellent covering or sheathing of any suitable or desirable type. However, in accordance with a further phase of the present invention it is preferable to fill the space between the ribs 32 or their equivalents on the upper members 22 with some material that may have either one or the other, or both, of two characteristics. One characteristic that such material 50 may have is the character of insulation against transfer of heat therethrough, in which case the material 30 may be of any suitable or conventional insulating material capable of being readily applied between and over the ribs 32 and their equivalents 26, 28 and 30. On the other hand the material 50 may be of a character which will reinforce the members 22 and particularly the ribs 32 and their equivalents against buckling, warping, or the like and in such case the material 50 may be concrete or the like simply poured or cast into place. The material 50 is preferably applied to a depth sufficient to cover the ribs 32 to a material extent as brought out in Fig. 3. Concrete, of course, does not have a high degree of resistability to transfer of heat through it and, accordingly, where concrete is employed some material of a higher insulating value is preferably provided over the upper surface of the same to enhance the heat insulating qualities thereof when desired.

On the other hand, cement, such as Portland cement, may be mixed with a suitable material of high heat insulation qualities and may be employed for the material 50 in which case the material 50 not only will reinforce the metallic portion of the structure against warping or distortion under load, but will also serve as a heat insulation material for insulating the roof against transfer of heat therethrough. One material which is ideally suitable to mix with cement for this purpose is vermiculite which, when mixed with suitable quantities of Portland cement, may be cast into place and thereafter not only enhance the strength of the roof itself, but also form an ideal heat insulation because of the air cells which the vermiculite causes to be distributed throughout the mixture.

In any event, after the material 50 has been applied to the roof structure, its outer surface is then preferably covered by a suitable roofing material such as 52 applied in any suitable or conventional manner for protecting the material 50 against the effects of weather thereon. It will be appreciated from the foregoing that a structure provided in accordance with the present invention enables a roof of extended span to be constructed with a relatively simple, efficient and unusually light and, therefore, economical manner, and that it may be easily and efficiently insulated against the transfer of heat therethrough.

Formal changes may be made in the specific embodiment of the invention described without departing from the spirit or substance of the broad invention, the scope of which is commensurate with the appended claims.

What is claimed is:

1. A roof structure comprising a plurality of superposed sheet metal members forming the major stress transmitting elements of said structure, each of said members comprising a relatively flat strip of sheet metal each having an outwardly extending flange along one side margin thereof and an outwardly extending hooked-sectioned portion along the opposite margin thereof, the uppermost of said members all being arranged in parallelism with each other and the lower of said members being arranged in parallelism with each other and all of said members arranged with the marginal flange thereof received within the hooked-sectioned margin of the next adjacent member in the direction of the plane of the roof and rigidly fixed therein, the upper of said members arranged with the flanges and hooked-sectioned margins thereof projecting upwardly and the lower of said members arranged with the flanges and hooked-sectioned margins thereof projecting downwardly, and the upper of said members being arranged in flat contacting relation with respect to the lower of said members and rigidly fixed thereto, the upper of said members being arranged with the flanges thereof extending diagonally of the length of said roof structure and the lower of said members being arranged with the flanges thereof extending diagonally of the length of said roof structure and transversely with respect to the direction of the flanges on the upper of said members.

2. An arched roof structure comprising longitudinally curved upper and lower sheet metal sections overlying the entire area of said roof structure and forming the main stress resisting elements of said roof section, each of said layers being formed of sheet metal members extending diagonally of said roof and the sheet metal members of the upper of said layers extending in a direction transverse to the direction which the sheet metal members of the lower of said layers extend, an outstanding flange along one edge of each of said members, and an outstanding hook-sectioned portion along the other edge of each of said members, said members in each of said layers being arranged with the flange at one edge thereof received in the hook-sectioned margin of the next adjacent member and rigidly fixed therein, the flanges of said members on the upper of said layers projecting upwardly and the flanges on the lower of said members projecting downwardly, and said members being arranged in flat contacting relationship with respect to each other and rigidly fixed together.

3. An arched roof structure comprising longitudinally curved upper and lower sheet metal sections overlying the entire area of said roof structure and forming the main stress resisting elements of said roof section, each of said layers being formed of sheet metal members extending diagonally of said roof and the sheet metal members of the upper of said layers extending in a direction transverse to the direction which the sheet metal members of the lower of said layers extend, an outstanding flange along one edge of each of said members and an outstanding hook-sectioned portion along the other edge of each of said members, and at least one outstanding rib integrally formed with each of said members intermediate the opposite side edges thereof and projecting in the same direction as said flange and hooked-shaped section, said members in each of said layers being arranged with the flange at one edge thereof received in the hook-sectioned margin of the next adjacent member and rigidly fixed therein, the flanges of said members on the upper of said layers projecting upwardly and the flanges on the lower of said members projecting downwardly, and said members being arranged in flat contacting relationship with respect to each other and rigidly fixed together.

4. A roof structure comprising upper and lower sheet metal sections overlying the entire area of said roof structure and forming the main stress resisting elements of said roof section, each of said layers being formed of sheet metal members extending diagonally of said roof and the sheet metal members of the upper of said layers extending in a direction transverse to the direction which the sheet metal members of the lower of said layers extend, an outstanding flange along one edge of each of said members, an outstanding hook-sectioned portion along the other edge of each of said members, said members in each of said layers being arranged with the flange at one edge thereof received in the hook-sectioned margin of the next adjacent member and rigidly fixed therein, the flanges of said members on the upper of said layers projecting upwardly and the flanges on the lower of said members projecting downwardly, and said members being arranged in flat contacting relationship with respect to each other, and rigidly fixed together, and a mass of heat insulating material overlying the upper surface of said upper layer and imbedding said flanges and hooked-sectioned margins therein.

5. An arched roof structure comprising longitudinally curved upper and lower sheet metal sections overlying the entire area of said roof structure and forming the main stress resisting elements of said roof section, each of said layers being formed of sheet metal members extending diagonally of said roof and the sheet metal members of the upper of said layers extending in a direction transverse to the direction which the sheet metal members of the lower of said layers extend, an outstanding flange along one edge of each of said members, an outstanding hook-sectioned portion along the other edge of each of said members, said members in each of said layers being arranged with the flange at one edge thereof received in the hook-sectioned margin of the next adjacent member and rigidly fixed therein, the flanges of said members on the upper of said layers projecting upwardly and the flanges on the lower of said members projecting downwardly, and said members being arranged in flat contacting relationship with respect to each other and rigidly fixed together.

6. A roof structure comprising upper and lower sheet metal sections overlying the entire area of said roof structure and forming the main stress resisting elements of said roof section, each of said layers being formed of sheet metal members extending diagonally of said roof and the sheet metal members of the upper of said layers extending in a direction transverse to the direction which the sheet metal members of the lower of said layers extend, an outstanding flange along one edge of each of said members, an outstanding hook-sectioned portion along the other edge of each of said members, said members in each of said layers being arranged with the flange at one edge thereof received in the hook-sectioned margin of the next adjacent member and rigidly fixed therein, the flanges of said members on the upper of said layers projecting upwardly and the flanges on the lower of said members extending downwardly, said members being arranged in flat contacting relationship with respect to each other and rigidly fixed together, and a mixture of Portland cement and vermiculite cast into place over said upper layer and imbedding said flanges and hooked-section margins therein.

7. An arched roof section comprising, in combination, an upper and a lower sheet metal layer lying in substantially flat contacting relationship with respect to each other and rigidly fixed together in curved conformation corresponding to the arch of said roof, each of said layers comprising a plurality of sheet metal members each having a substantially flat body portion, upstanding portions along the margins of adjacent members cooperating with each other to provide upstanding ribs, and additional ribs intermediate the side margins of said members, the ribs of the members in the upper of said layers projecting upwardly and the ribs in the members of the lower of said layers projecting downwardly, the members of the upper layer extending diagonally of the roof and the members of the lower layer being arranged transversely with respect thereto, and a mass of substantially rigid material overlying the upper of said layers and imbedding said ribs therein.

RICHARD H KRUEGER.